Figure 1:
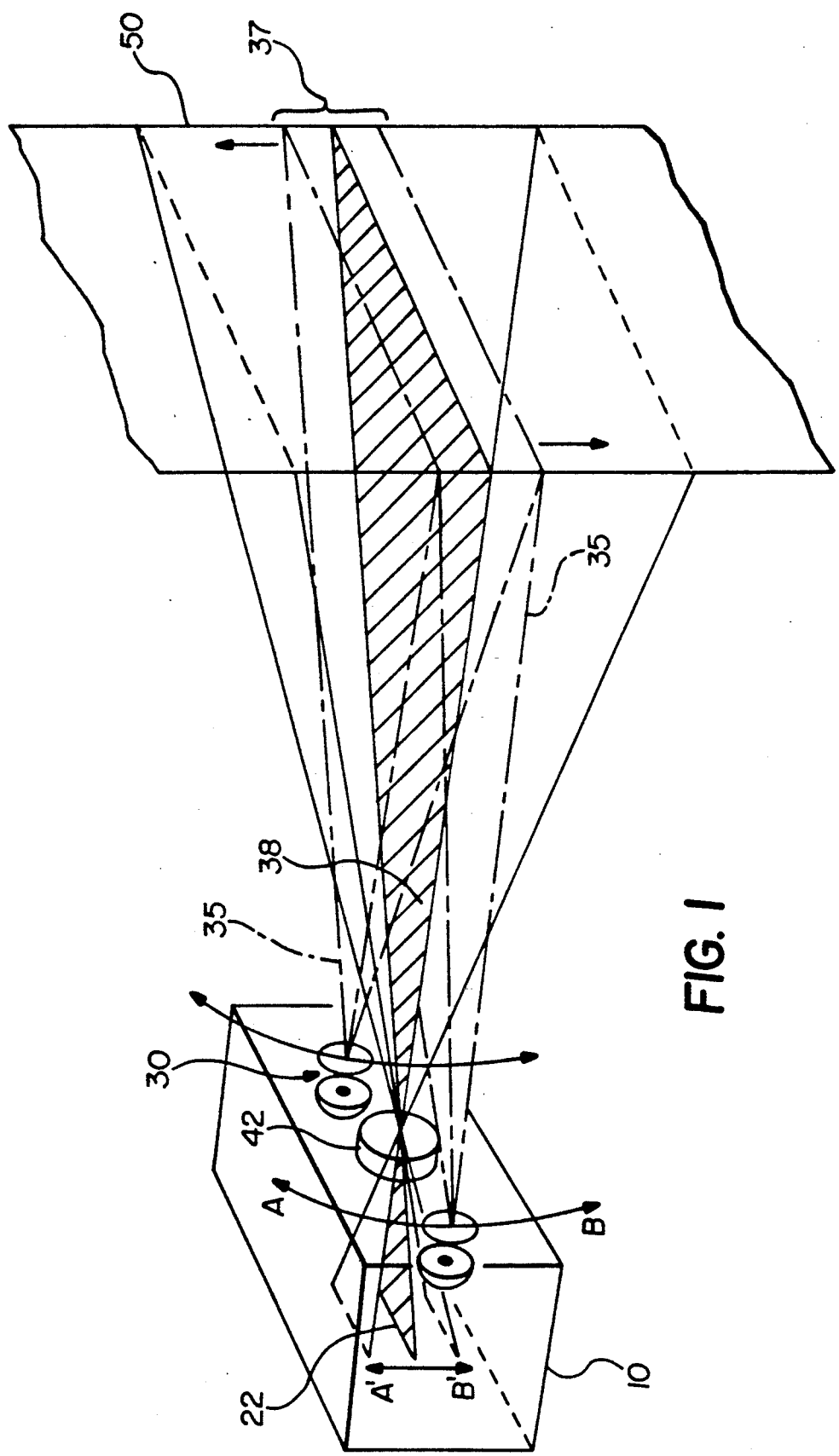

United States Patent [19]

Mutze et al.

[11] Patent Number: 5,063,460
[45] Date of Patent: Nov. 5, 1991

[54] ELECTRONIC CAMERA FOR LINE-BY-LINE IMAGING OF DOCUMENTS

[75] Inventors: Ulrich Mutze; Gerhard Quanz, both of Stuttgart, Fed. Rep. of Germany; The A. Vuong, Cleveland Heights, Ohio; Wolfgang Kiesewetter, Waiblingen-Neustadt, Fed. Rep. of Germany

[73] Assignee: Eastman Kodak Company, Rochester, N.Y.

[21] Appl. No.: 553,486

[22] Filed: Jul. 13, 1990

[30] Foreign Application Priority Data

Jul. 15, 1989 [DE] Fed. Rep. of Germany ....... 3923521

[51] Int. Cl.$^5$ .............................................. H04N 5/30
[52] U.S. Cl. .................................... 358/474; 358/483; 358/209
[58] Field of Search ............... 358/483, 482, 474, 209, 358/225, 229

[56] References Cited

U.S. PATENT DOCUMENTS

| Re. 32,137 | 5/1986 | Lianza | 250/578 |
|---|---|---|---|
| 4,346,984 | 8/1982 | Kingsley | 355/8 |
| 4,426,149 | 1/1984 | Kremmit et al. | 355/8 |
| 4,443,742 | 4/1984 | Schneider | 318/85 |
| 4,605,971 | 8/1986 | Kimura | 358/483 |
| 4,701,809 | 10/1987 | Barrett | 358/293 |
| 4,775,799 | 10/1988 | Milch et al. | 358/483 |
| 4,879,604 | 11/1989 | Koshiyouji | 358/474 |
| 4,910,601 | 3/1990 | Gerlach | 358/474 |

FOREIGN PATENT DOCUMENTS 1297763 5/1962 France .

OTHER PUBLICATIONS

Journal of Imaging Tech., vol. 11, No. 5, Oct. 1985, pp. 210–214, High Speed Image Scanner, Hiroyuki et al.

Primary Examiner—Stephen Brinich
Attorney, Agent, or Firm—David M. Woods

[57] ABSTRACT

An electronic camera comprises an illumination unit (30) for line-by-line imaging of large-size documents (50) or the like on an elongate solid-state image sensor, in particular a CCD line sensor (22). The illumination unit is provided with optical elements for producing a light strip (37) on the document (50). The illumination unit (30) is arranged within the camera housing (10) for pivotal movement in the direction of the arrows "A" or "B". The CCD line sensor (22) is movable, in response to the pivotal movement of the illumination unit (30), in the vertical direction within the image plane of the camera lens (42) in the direction of the arrows "A" or "B" so that the light strip (37) guided across the document (50) can be imaged on the CCD line sensor (22).

17 Claims, 5 Drawing Sheets

ELECTRONIC CAMERA FOR LINE-BY-LINE IMAGING OF DOCUMENTS

The invention relates to an electronic camera for line-by-line imaging of documents or the like on an elongate solid-state image sensor, in particular a CCD line sensor, said camera comprising an illumination unit provided with optical elements as well as a camera lens.

Electronic cameras of this type are known. They yield a very high image resolution. The commercially available EIKONIX 1000 "Digital Imaging Camera", for example, senses up to 4096 pixels per line and is thus capable of an image resolution of more than 20 million pixels (4096×5200 lines).

Such cameras equipped with CCD line sensors are of a relatively simple structure. However, compared with cameras equipped with CCD area sensors they require longer exposure times because only a small portion of the light falling through the lens is received by the CCD line sensor. For this reason the scene has to be additionally illuminated.

In the case of documents of standard DIN A4 size it is no problem to attain the required illumination of several thousand lux by a homogeneous illumination of the total document. However if the document is considerably larger and has, e.g. the size of a blackboard or a flip chart or if the object is an exhibit, a high light output is required for uniformly illuminating it.

As a result the audience present during the taking session may be blinded and disturbed. For this reason, one falls back on the conventional photographic taking methods for these purposes because electronic recording processes cannot as a rule be used owing to their low image resolution and/or high costs.

It is the object of the invention to provide a camera of the generic type by which large-size documents and objects can be imaged line by line and stored in order to be printed out by a printer.

In accordance with the invention this object is attained in that for imaging large-size documents, the illumination unit with its optical elements is pivotable for producing a light strip on the document and in that the CCD line sensor is movable, in response to the pivotal movement of the illumination unit, within the image plane of the lens such that the light strip can be imaged on the CCD line sensor.

According to a useful modification of the invention the light strip is formed on the document in that a gap is arranged within the light beam produced by the illumination unit, said gap including a positive optical element which directs the light falling through the gap into the lens.

In detail the invention provides that the light beam generated by the illumination unit passes a negative cylindrical lens or a Fresnel lens or a diffusing screen in order that the light beam be expanded to the width of the gap.

The advantage reached by the invention consists in that by combining a line-sensor camera and an illumination unit which illuminates only a strip-shaped section of the document, the light output required for a given illumination can be drastically reduced. The blinding effect of the illumination which substantially depends on the size of the area illuminated can also be reduced. Another advantage consists in that during the scanning operation, a clearly defined, bright illumination strip is projected onto the document or the object so that during a test operation (without data storage) said illumination strip can easily be aligned and sharply focused. The viewer is looking in the direction towards the object, the field of vision not being narrowed as in the case of a viewfinder. This is particularly advantageous to those wearing glasses. Nor is the viewer in any danger of shaking or displacing the tripod carrying the camera while looking through the camera viewfinder.

Further features and advantages can be inferred from the remaining subclaims as well as from the description of several embodiments of the invention schematically illustrated in the drawing in which all parts not necessary for understanding the invention have been omitted for the sake of clarity.

Figure 3:
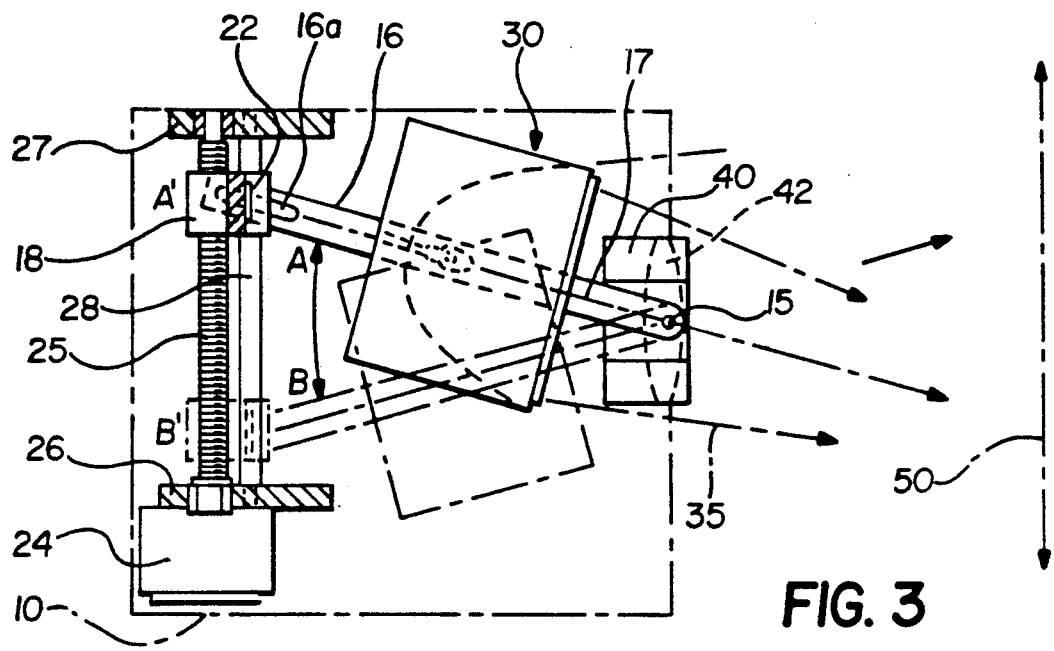
Figure 2:
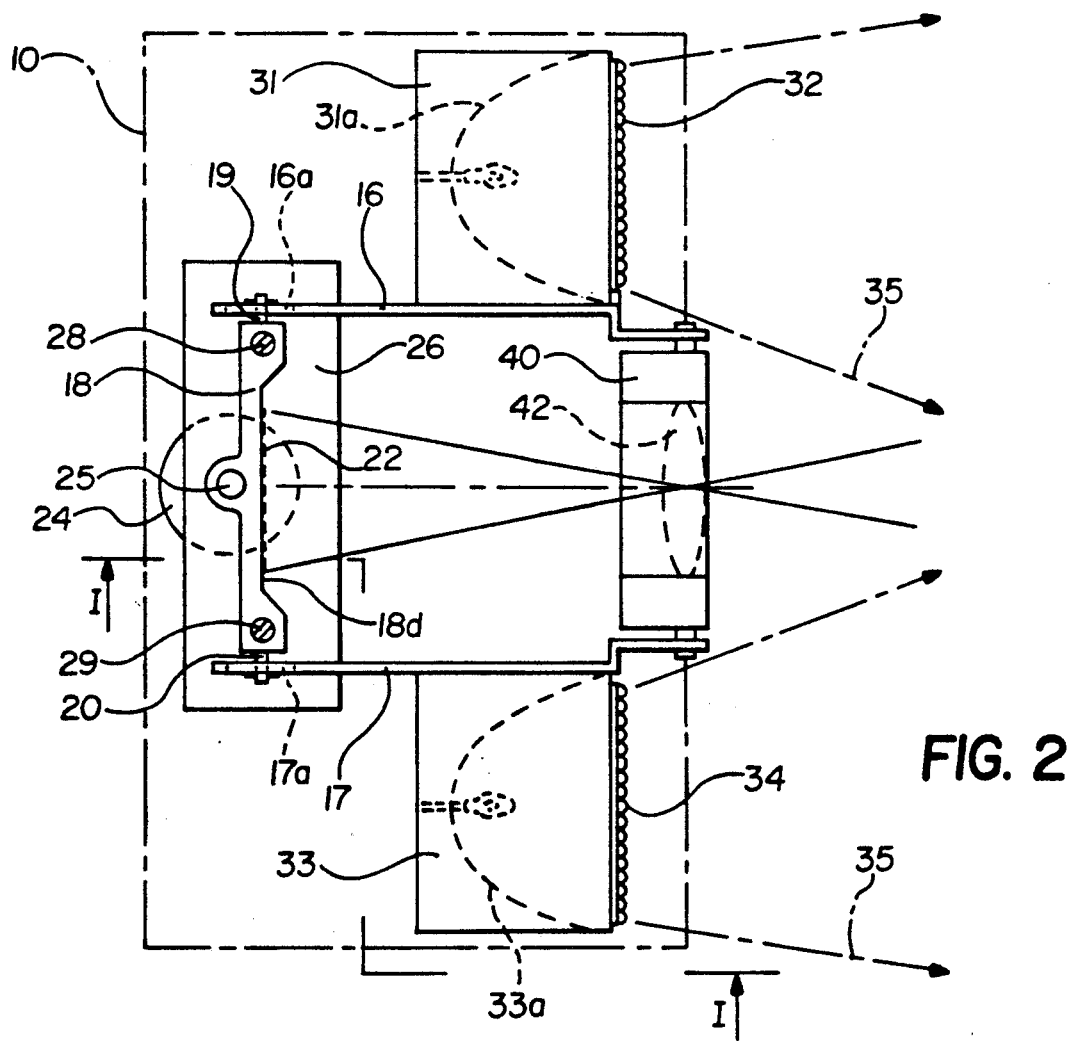
Figure 5:
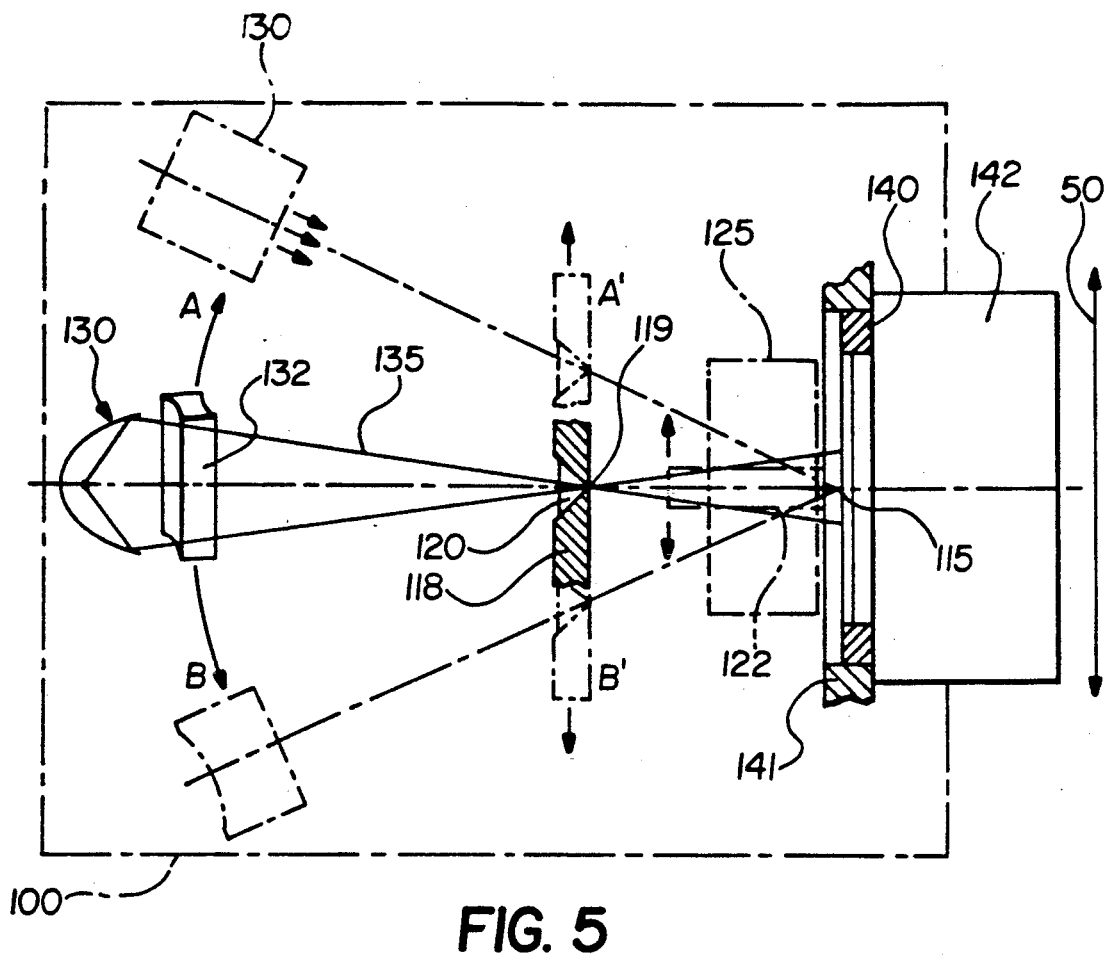
Figure 4:
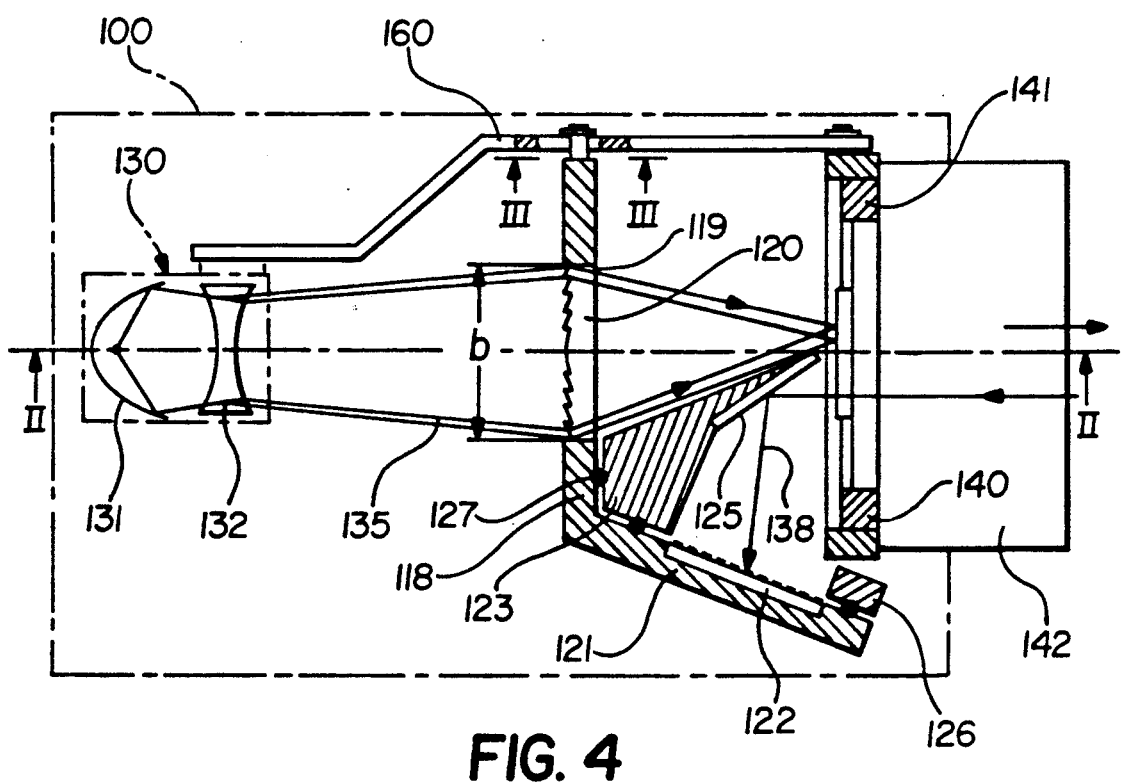
Figure 6:
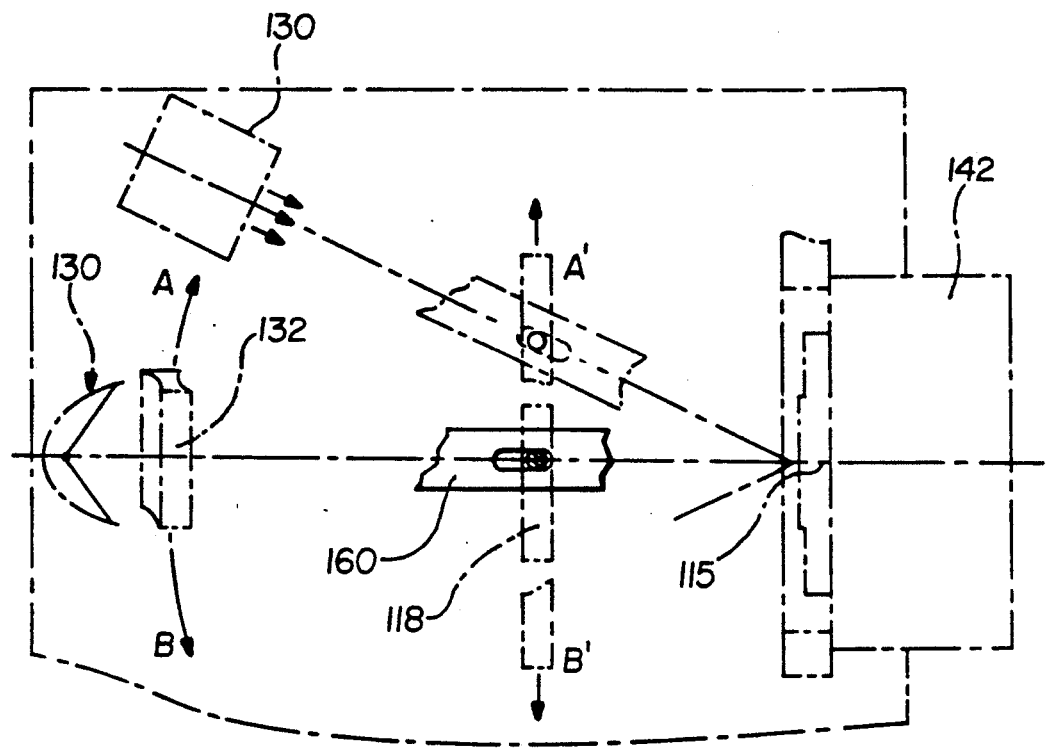
Figure 7:
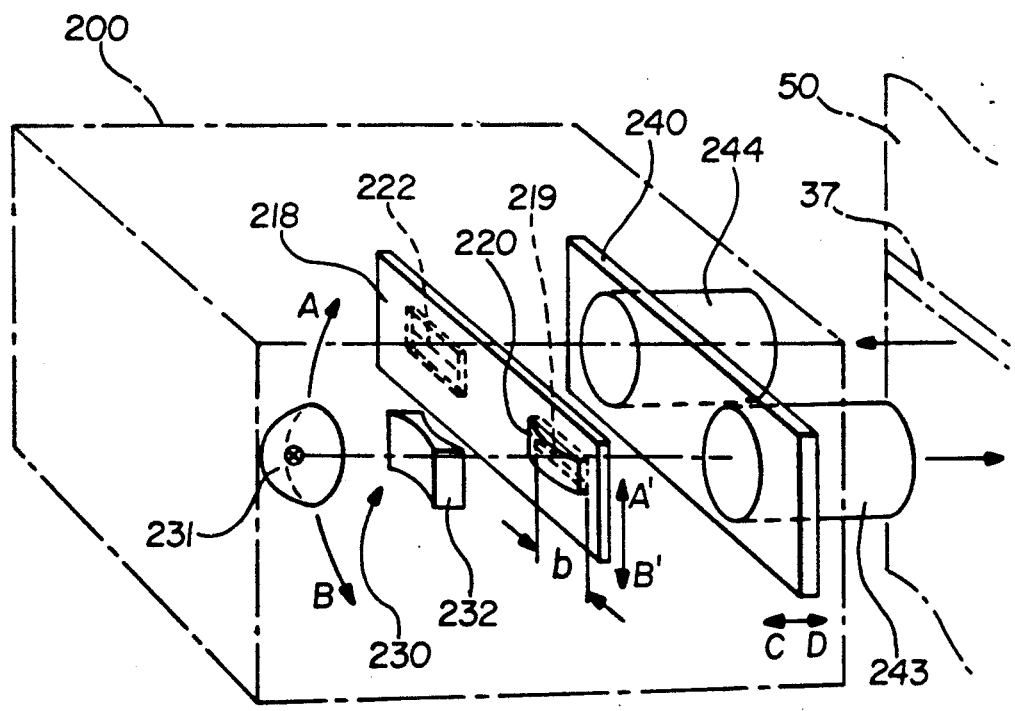
Figure 9:
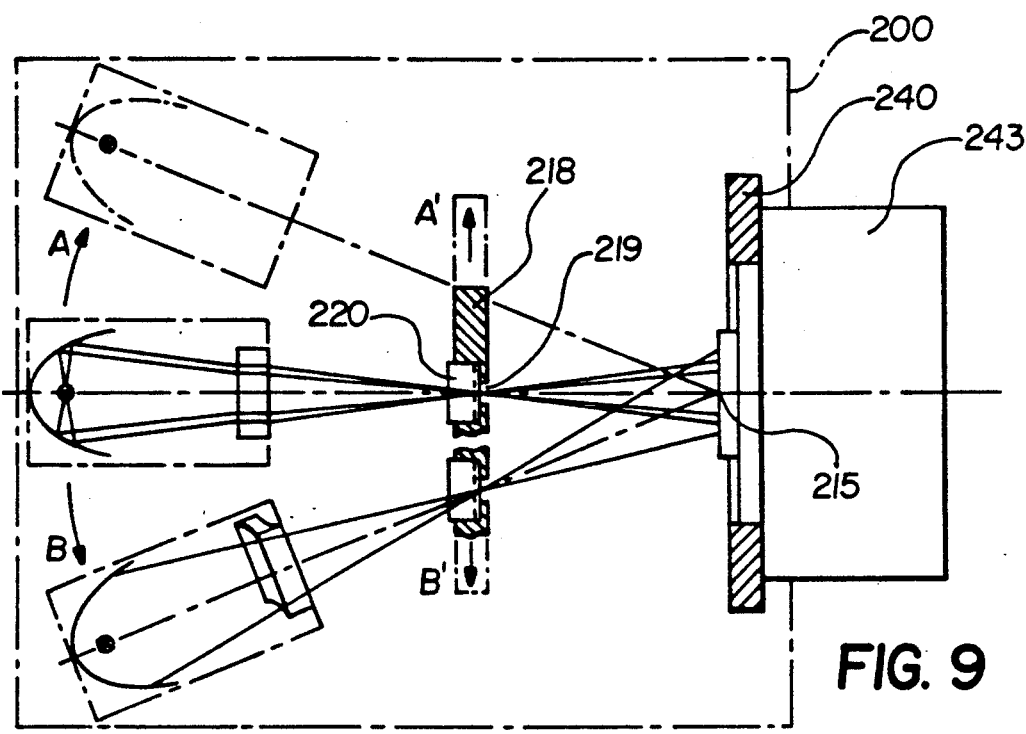
Figure 8:
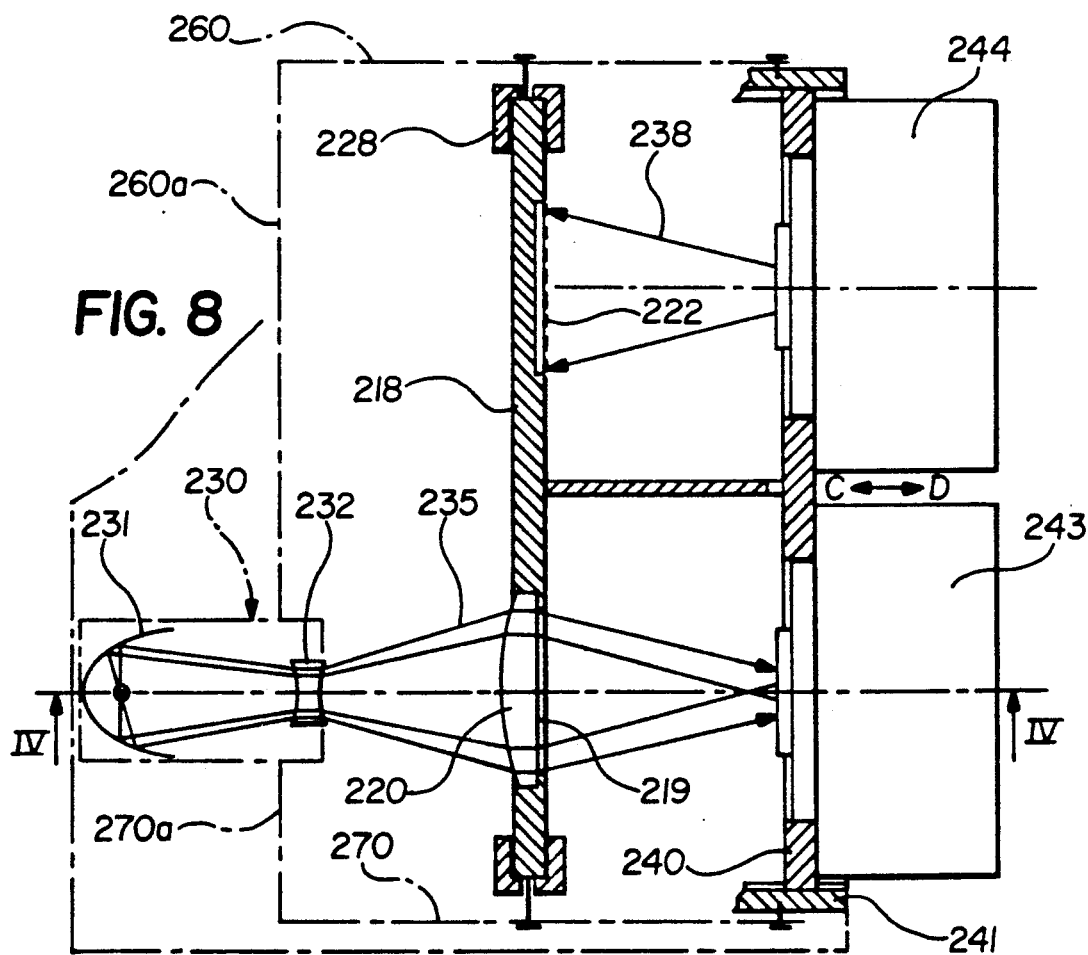

In the drawing:

FIG. 1 is a perspective view showing the basic structure and mode of functioning of the electronic camera according to the invention, FIG. 2 is a plan view of a first embodiment of the electronic camera according to the invention as shown in FIG. 1, FIG. 3 is a longitudinal sectional view of the camera along line I—I in FIG. 2, FIG. 4 is a plan sectional view of a further embodiment of an electronic camera, FIG. 5 is a longitudinal sectional view of the camera along line II—II in FIG. 4, FIG. 6 is a partial sectional view of the camera along line III—III in FIG. 4, FIG. 7 is a perspective view of a further embodiment of an electronic camera including two lenses, FIG. 8 is a plan sectional view of the camera according to FIG. 7, and FIG. 9 is a longitudinal sectional view of the camera along line IV—IV in FIG. 8.

The underlying principle and mode of functioning of the electronic camera according to the invention are illustrated in FIG. 1. The camera is provided with an elongate CCD line sensor 22 in the image plane of a taking lens 42 as well as with an illumination unit 30 by means of which a light strip 37 can be produced on a large-size document 50. While the document 50 is being scanned line by line, the illumination unit 30 is pivotable in the direction of the arrows "A" or "B", with the CCD line sensor 22 being movable, in response to the pivotal movement of the illumination unit 30 in the vertical direction within the image plane of lens 42 in the direction of the arrows A' or B' so that the light strip 37 guided across the document 50 can be imaged on the CCD line sensor 22.

A first embodiment of a possible constructional design of the camera illustrated in FIG. 1 is shown in FIGS. 2 and 3.

A camera housing 10 is shown in dash-dotted lines, said housing 10 incorporating in the case of the embodiment a pivotable illumination unit 30. The illumination unit 30 comprises two separate illumination units 31 and 33 each of which consists of a light source and an elliptical parabolic concave mirror 31a and 33a. In order to form the light strip 37 on document 50, each illumination unit is provided with a diffusing screen 32 and 34, respectively, which has a lenticular structure. Each of the two illumination units 31 and 33 is arranged on a bar 16 and 17 hinged laterally to a lens carrier 40. Both bars are pivotable upwards and downwards jointly with the illumination units 31 and 33 by means of a spindle drive.

The spindle drive consists of a vertically upright spindle 25 mounted for rotation in the area behind the image plane of lens 42 between a lower mounting plate 26 and an upper mounting plate 27. In the case of the embodiment a motor 24 for driving the spindle 25 is arranged at the lower side of mounting plate 26.

Moreover, a vertically upright guide column 28 and 29 each held in the lower and upper mounting plates 26 and 27 is provided at the left and the right side of the image plane.

A crossbar 18 arranged on spindle 25 and guided on the two guide columns 28 and 29 is provided with a lug 19 and 20 on either of its two end sides. The lugs extend through oblong holes 16a and 17a disposed in the area of the free ends of the bars 16 and 17. In this manner the bars 16 and 17 carrying the illumination units 31 and 33 are mounted on the crossbar 18.

Depending on the direction of rotation of the motor-driven spindle 25 the crossbar 18 is either raised or lowered and the two bars 16 and 17 are pivoted together with the illumination units 31 and 33 upwards in the direction of the arrow "A" or downwards in the direction of the arrow "B". The CCD line sensor 22 is arranged on a surface 18d of crossbar 18, which faces the lens 42 and is located in the area of the image plane thereof. Therefore, when the crossbar 18 is raised or lowered during the pivotal movement of the total illumination unit 30 the CCD line sensor 22 is moved along rectilinearly up or down across the image plane of lens 42.

The illumination units 31 and 33 are arranged on the bars 16 and 17 such that the rays of their light beams 35 extend substantially in parallel with the bars. Hence, when the crossbar 18 is raised the light beams 35 of the illumination units 31 and 33 are directed obliquely downwards in an extension of the bars 16 and 17 or when the crossbar 18 is lowered, they are directed obliquely upwards.

Due to the lenticular structure of the diffusing screens 32 and 34 the light beam is focused such that a substantially narrow light strip 37 appears on the document 50. This light strip is imaged on the CCD line sensor 22 via lens 42. By pivoting of the illumination unit 30 the light strip is moved across document 50, e.g. from the top to the bottom, and a large-size document is scanned line by line by means of the CCD line sensor 22 moved along in the camera across the image plane of lens 42.

In the embodiment to FIGS. 4 and 5 a carrier plate 118 is arranged between a pivotable illumination unit 130 and a lens 142. The carrier plate includes a gap 119 which is disposed within the light beam 135 generated by the illumination unit 130. The illumination unit 130 comprises a halogen light source, an elliptical concave mirror 131 and a negative cylindrical lens 132 by means of which the light beam 135 focused onto the center of the gap is expanded in the longitudinal direction to assume the width "b" of gap 119. Gap 119 includes a positive optical element, such as a cylindrical lens or a Fresnel lens 120 which directs the light falling through gap 119 into the lens 142.

The carrier plate 118 comprises a bent-off portion 121 which extends laterally of the light beam 135 in the direction towards the lens 142 and includes an elongate CCD line sensor 122. The sensor is located in the same plane as gap 119 as shown in dash-dotted lines in FIG. 5.

As illustrated in particular in FIG. 4, a mirror 125 associated with the CCD line sensor 122 is stationarily mounted between gap 119 and the aperture of lens 142 which faces the illumination unit 130. The mirror forms an acute angle with the optical axis. Its front edge meets the light beam 135 which is directed into the aperture of lens 142 and images the gap 119 in lens 142, at the level of the optical axis in the area of the aperture of lens 142. As a result the objective lens is divided into two half-lenses so that one half-lens 142 projects the illuminated gap 119 in the form of a light strip onto document 50 and the other half-lens 142 images the scene of the document 50, which is illuminated by the light strip, via mirror 125 on the CCD line sensor 122.

By means of its bent-off portion 121 the carrier plate 118 is arranged for shifting movement in the vertical direction on a stationary holder 123 of the mirror 125 and on a stationary bar 126. It is shifted in response to the pivotal movement of the illumination unit 130 in the directions of the arrows "A" or "B" (FIG. 6). For this purpose the carrier plate 118 is connected for driving movement with a bar 160 hinged to the holder 141 of the lens carrier 140 and pivotable by a motor (not illustrated), the free end of said bar carrying the illumination unit 130.

In order that the scene of document 50 which is to be imaged via the mirror 125, be always received by the CCD line sensor 122, the stationary mirror 125 is dimensioned in a suitable manner, as is illustrated in FIG. 5 in dash-dotted lines.

During the pivotal movement of the illumination unit 130 in the direction of the arrows "A" or "B" and the vertical shifting of the carrier plate 118 in the direction of the arrows A' or B' the optical axis always passes through the gap 119 in the carrier plate 118 and the center 115 of the aperture of lens 142, which faces the illumination unit 130 (FIGS. 5 and 6).

In the embodiment according to FIGS. 7 to 9 a projection lens 243 of high light-gathering power is provided for projecting the illuminated gap 219 in the form of a light strip 37 onto document 50, and a taking lens 244 is provided for imaging the scene of document 50 illuminated by light strip 37 onto the CCD line sensor 222. Both lenses 243 and 244 have the same focal lengths and are arranged at minimum distance from each other in a common lens carrier plate 240. This plate is slightly shiftable in the directions "C" or "D" for focusing of the light strip.

As in the previous embodiment the pivotable illumination unit 230 has a halogen light source as well as an elliptical concave mirror 231 and a negative cylindrical lens 232. The gap 219 located within the light beam 235 of the illumination unit 230 and the elongate cylindrical lens 220 inserted into it as well as the CCD line sensor 222 situated in the image plane of the taking lens 244 are jointly arranged in a carrier plate 218 vertically shiftable in stationary guide means 228 between the illumination unit 230 and the lens carrier plate 240.

By means of the negative cylindrical lens 232 of the illumination unit 230 the light beam 135 focused into the center of the gap is expanded in the longitudinal direction to assume the width "b" of gap 219 whilst the cylindrical lens 220 inserted in gap 219 directs the light falling through gap 219 into the projection lens 242.

The carrier plate 218 including the gap 219 and carrying the CCD line sensor 222 is once again shifted in response to the pivotal movement of the illumination unit 230, in the direction of the arrows "A" or "B".

As can be seen from FIG. 8 carrier plate 218 is in driving connection with a linkage 260 and 270 which is hinged to the holder 241 of the lens carrier plate 240, pivotable by a motor and shown in dash-dotted lines. Its bent-off ends 260a and 270a carry the illumination unit 230. During pivotal movement of the illumination unit 230 (FIG. 9) and shifting of the carrier plate 218 the optical axis once again passes through gap 219 and the center 215 of the aperture of lens 242.

We claim:

1. Electronic camera for line-by-line imaging of documents or the like on an elongate solid-state image sensor, in particular a CCD line sensor, said camera comprising an illumination unit provided with optical elements as well as a camera lens, characterized in that for the imaging of large-size documents (50), the illumination unit (30, 130, 230) together with its optical elements (32, 34, 132, 232) is pivotable for producing a light strip (37) on the document (50) and in that the CCD line sensor (22, 122, 222) is movable, in response to said pivotal movement of the illumination unit (30, 130, 230), within the image plane of the lens (42, 142, 244) such that the light strip (37) can be imaged on the CCD line sensor (22, 122, 222).

2. Electronic camera, in particular according to claim 1, characterized in that for producing the light strip (37) on the document (50), a gap (119, 219) is arranged within the light beam (135, 235) generated by the illumination unit (130, 230), said gap including a positive optical element (120, 220) which directs the light falling through gap (119, 219) into the lens (142, 243).

3. Electronic camera according to claim 2, characterized in that the light beam (135, 235) generated by the illumination unit (130, 230) passes through a negative cylindrical lens (132, 232) or a Fresnel lens or a diffusing screen in order to be expanded to the width "b" of gap (119, 219).

4. Electronic camera according to claim 1, characterized in that the illumination unit (30) comprises two separate illumination units (31, 33), in that each of said separate units is arranged on a bar (16, 17) each laterally hinged to the lens carrier (40) and in that the bars (16, 17) are pivotable up and down jointly with the illumination units (31, 33) by means of a spindle drive (24, 25, 18).

5. Electronic camera according to claim 4, characterized in that in order to produce the light strip (37) on the document (50), the illumination units (31, 33) are provided with a cylindrical lens or with a diffusing screen (32, 34) having a lenticular structure.

6. Electronic camera according to claim 4, charaterized in that in the area behind the image plane of the lens (42), a vertically upright, motor-driven spindle (25) is provided which is mounted for rotation between a lower mounting plate (26) and an upper mounting plate (27) and in that one vertically upright guide column (28, 29) each is mounted in the lower and in the upper mounting plate (26, 27) at the left and the right side of the image plane.

7. Electronic camera according to claim 6, characterized in that the free ends of the bars (16, 17) are mounted to a crossbar (18) arranged on spindle (25) and guided on the guide columns (28, 29).

8. Electronic camera according to claim 7, characterized in that the CCD line sensor (22) is arranged on a surface (18d) of crossbar (18), which faces the lens (42), and in that depending on the direction of rotation of spindle (25), the crossbar (18) can be raised or lowered and the CCD line sensor (22) can be moved into the image plane of lens (42).

9. Electronic camera according to claim 8, characterized in that the illumination units (31, 33) are arranged on the bars (16, 17) such that the rays of their light beams (35) extend substantially parallely with the bars (16, 17) and in that when the crossbar (18) is in its raised position, the light beams (35) of the illumination units (31, 33) are directed obliquely downwards in an extension of the bars (16, 17) and when the crossbar (18) is in its lowered position, are directed obliquely upwards in an extension of the bars (16, 17).

10. Electronic camera according to claim 2, characterized in that the gap (119) is provided in a carrier plate (118) arranged between the illumination unit (130) and the lens (142) and in that the carrier plate (118) comprises a bent-off portion (121) extending laterally of the light beam (135) in the direction towards the lens (142), said bent-off portion including a CCD line sensor (122) located in the same plane as gap (119).

11. Electronic camera according to claim 10, characterized in that in the area of the light beam extending between gap (119) and the aperture of lens (142), a mirror (125) associated with the CCD line sensor (122) is arranged such that one half-lens (142) projects the illuminated gap (119) in the form of a light strip (37) onto the document (50) and the other half-lens (142) images the scene on the document (50), which is illuminated by light strip (37), via mirror (125) onto CCD line sensor (122).

12. Electronic camera according to claim 11, characterized in that the carrier plate (118) which includes the gap (119) and carries the CCD line sensor (122) is shiftable on a stationary holder (123) of mirror (125) and on a stationary bar (126) and in that the carrier plate (118) is shifted in response to the pivotal movement of the illumination unit (130).

13. Electronic camera according to claim 12, characterized in that the carrier plate (118) is in driving connection with a bar (160) which is hinged to a holder (141) of a lens carrier (140) and pivotable by a motor and to the free end of which the illumination unit (130) is attached.

14. Electronic camera according to claim 2, characterized in that a projection lens (243) is provided for projecting the illuminated gap (219) in the form of a light strip (37) on document (50) and a taking lens (244) is provided for imaging the scene of the document (50), which is illuminated by light strip (37), on the CCD line sensor (222).

15. Electronic camera according to claim 14, characterized in that the projection lens (243) and the taking lens (244) have the same focal lengths and in that both lenses are arranged side by side at a small distance from each other on a common lens-carrier plate (240).

16. Electronic camera according to claim 15, characterized in that the gap (219) located within the light beam (235) of the illumination unit (230) and the CCD line sensor (222) positioned in the image plane of the taking lens (244) are jointly arranged on a carrier plate (218) disposed between the illumination unit (230) and the lens carrier plate (240) and vertically shiftable in guide means (228).

17. Electronic camera according to claim 16, characterized in that the carrier plate (218) is in driving connection with a linkage (260, 270) which is hinged to a holder (241) of the lens-carrier plate (240) and pivotable by a motor and whose bent-off ends (260a, 270a) carry the illumination unit (230) and in that the carrier plate (218) is shiftable in response to the pivotal movement of the illumination unit (230).

* * * * *